(12) United States Patent
Strutz

(10) Patent No.: US 8,136,210 B2
(45) Date of Patent: Mar. 20, 2012

(54) SEAT BELT

(75) Inventor: Michael Strutz, Neuendorf (DE)

(73) Assignee: Autoliv Development AB, Vargarda (SE)

( * ) Notice: Subject to any disclaimer, the term of this patent is extended or adjusted under 35 U.S.C. 154(b) by 901 days.

(21) Appl. No.: 12/095,670

(22) PCT Filed: Nov. 16, 2006

(86) PCT No.: PCT/EP2006/011001
§ 371 (c)(1),
(2), (4) Date: May 30, 2008

(87) PCT Pub. No.: WO2007/065543
PCT Pub. Date: Jun. 14, 2007

(65) Prior Publication Data
US 2010/0308637 A1 Dec. 9, 2010

(30) Foreign Application Priority Data
Dec. 6, 2005 (DE) .......... 10 2005 058 343

(51) Int. Cl.
*B60R 22/16* (2006.01)
*B60R 22/18* (2006.01)

(52) U.S. Cl. ..... 24/163 R; 24/198; 280/733; 280/801.1; 280/808

(58) Field of Classification Search ............ 24/198, 24/163 R; 280/808, 801.1, 733
See application file for complete search history.

(56) References Cited

U.S. PATENT DOCUMENTS

| | | | | | |
|---|---|---|---|---|---|
| 4,348,037 | A | * | 9/1982 | Law et al. ................. | 280/733 |
| 5,257,820 | A | * | 11/1993 | Kosugi ..................... | 280/808 |
| 5,303,953 | A | * | 4/1994 | Kamiyama et al. ........ | 280/733 |
| 6,279,945 | B1 | * | 8/2001 | Schneider et al. ........ | 280/733 |
| 6,352,282 | B2 | * | 3/2002 | Hirose ..................... | 280/733 |
| 2004/0250387 | A1 | | 12/2004 | Jones et al. | |

FOREIGN PATENT DOCUMENTS

DE 103 27 753 A1 1/2005
DE 10 2005 004 818 A1 8/2006

\* cited by examiner

*Primary Examiner* — Robert J Sandy
(74) *Attorney, Agent, or Firm* — Brinks Hofer Gilson & Lione

(57) ABSTRACT

A seat belt (2) for motor vehicles, has a restraining element (4) for a seat belt tongue (3). The restraining element protrudes from the seat belt (2), from only on one side thereof and the seat belt (2) may be configured as a multi-layer seat belt (2) forming a hollow space (5) between the seat belt layers (21, 22).

9 Claims, 3 Drawing Sheets

SEAT BELT

CROSS REFERENCE TO RELATED APPLICATIONS

This application claims priority to DE 10 2005 058 343.1, filed Dec. 6, 2005 and PCT/EP2006/011001, filed Nov. 16, 2006.

FIELD OF THE INVENTION

The invention relates to a seat belt for motor vehicles, comprising a restraining element for a seat belt tongue slidable along seat belt webbing, the element protruding from one side surface of the seatbelt.

BACKGROUND OF THE INVENTION

From the state of the art seat belts are known, wherein a restraining element, a so-called a strap button, is provided in order to hold a seat belt tongue in a predefined position in a parking position of a belt system (while the belt is not fastened). This strap button is made of two or more parts which are pierced or pushed on both sides through the belt webbing of the seat belt and are held together by means of a clip or pin connection. The strap button prevents the seat belt tongue from resting on the seat cushion in the inoperative position and allows the seat belt tongue to be positioned in the desired position to be conveniently accessed by a user. A strap button of this type is known from US 2004/0250387 A1.

The strap button protruding from the seat belt on both side surfaces of belt webbing in accordance with the prior art creates an aesthetic impairment and makes it necessary to configure the seat belt tongue on the side facing away from the seat cushion such that the seat belt tongue can be suspended in a flat manner in the inoperative position and rest against the seat belt.

Penetration of the seat belt webbing entirely through its thickness when the strap button elements are joined results in weakening of the webbing material. In addition, if inflatable seat belts are used, it is difficult to guarantee sufficient gas flow in the region of the strap button since the prior art connection approach prevents the webbing from being easily inflated and provides clearance for the flow of gas through its interior.

DE 103 27 753 A1 describes a sensor arrangement to be attached to a belt, particularly to a seat belt of a motor vehicle, wherein a sensor is attached to the belt on the upper side of the belt facing away from the passenger. The sensors determine the heart rate, for example, or the body temperature, or they can be configured as microphones.

It is the object of the present invention to provide a seat belt which is comfortable to use, provides occupant safety, and is visually appealing.

This object of the invention is achieved according to the invention by a seat belt having the characteristics described herein. Advantageous embodiments and further developments of invention are also disclosed.

The seat belt for motor vehicles according to the invention, includes a restraining element for a seat belt tongue, the element protruding from the seat belt, provides for a one-sided arrangement of the restraining element on the seat belt such that one side of the seat belt, preferably the side facing the user of the belt, has no projecting or protruding restraining element or a belt buckle latch stopper. In the parking position, the buckle latch rests flat against the seat belt since the restraining element visibly and effectively projects only on the seat belt back surface. In this way, in the parking position, protrusion of the belt front surface in the direction of the vehicle interior is eliminated. The invention further provides that the seat belt may be configured as a multi-layer seat belt comprising a hollow space, wherein the belt can be filled with an appropriate gas via a gas generator. This hollow space is formed by a plurality of seat belt layers and is used for inflatable seat belt systems.

In order to be able to also use seat belt tongues that have a wider belt slot, it is provided that the restraining element of this invention is at least 4 mm thick in order to be able to guarantee secure fastening of the seat belt tongue in the desired position.

Likewise, it is possible that the restraining element extends at least across half the width of the seat belt, preferably across nearly the entire width of the belt webbing, in order to cover corresponding slot cross-sections and thus guarantee secure association of the seat belt tongue with the seat belt. On the correspondingly large restraining elements, a label with informational content may be applied, which provides information, for example, about the design features or the properties of the seat belt, or warnings required by regulations. In this case, the restraining element is preferably disposed on the visible side surface of the belt webbing such that the informational content of the label can be identified by the belt user. Furthermore, arranging the restraining element on the visible side surface has the advantage that, particularly in the case of belt systems integrated in the seat, the restraining element does not negatively influence the storage position, thus producing an orderly appearance overall.

It is provided that the restraining element is fastened in the conventional manner to the seat belt layer, which is to say it is positively fastened by a mechanical fastener to the inside of the seat belt to a layer of the seat belt in order to fix the seat belt tongue in place. A basic alternative to the positive mechanical attachment is to glue or weld it on as a non-positive or bonded connection of the restraining element to one side of the seat belt or one side surface of a seat belt layer.

In all cases this ensures that the inflation behavior of an inflatable seat belt is not changed and that using comfort is not impaired by the fact that part of the restraining element is disposed on the side surface facing the belt user in the operating or usage position. To this end, the restraining element is preferably disposed on the side surface of the seat belt fading the backrest cushion.

BRIEF DESCRIPTION OF THE DRAWINGS

The invention will be explained in more detail hereinafter with reference to the attached figures, wherein.

DETAILED DESCRIPTION OF THE INVENTION

Figure 1:
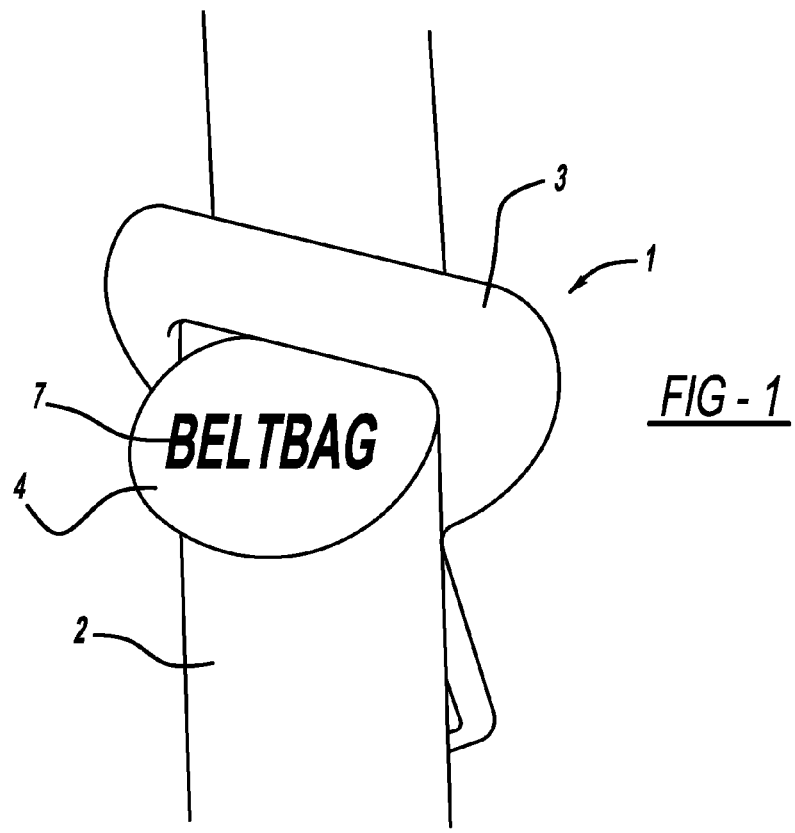
FIG. 1 is a schematic, perspective illustration of a belt system.

FIG. 1 shows a belt system 1 comprising a seat belt 2 and a seat belt tongue 3. The seat belt tongue 3 threaded into in a belt buckle and positively locked when the seat belt 2 is attached. The seat belt tongue 3 is attached displaceably on the seat belt 2. FIG. 1 shows the seat belt 2 in the inoperative position (i.e. the belt system is not fastened around the user), in which it is guided substantially vertically from an upper belt deflection point to a lower anchorage. In this position, the seat belt tongue 3 rests on the restraining element 4, which extends substantially across the entire width of the seat belt 2, wherein the restraining element 4, on the surface of which lettering 7 or another symbol may be provided, is located on the back surface of the seat belt 2, which is to say on the side surface facing away from the belt user. The seat belt tongue 3, on the other hand, protrudes with the seat belt tongue end that can be inserted in the belt buckle in the direction of the belt user such that the user can easily grasp the seat belt tongue 3. The restraining element 4 prevents the seat belt tongue 3 from sliding down to the seat belt anchorage and holds the seat belt tongue 3 at grip height for the belt user.

Figure 2:
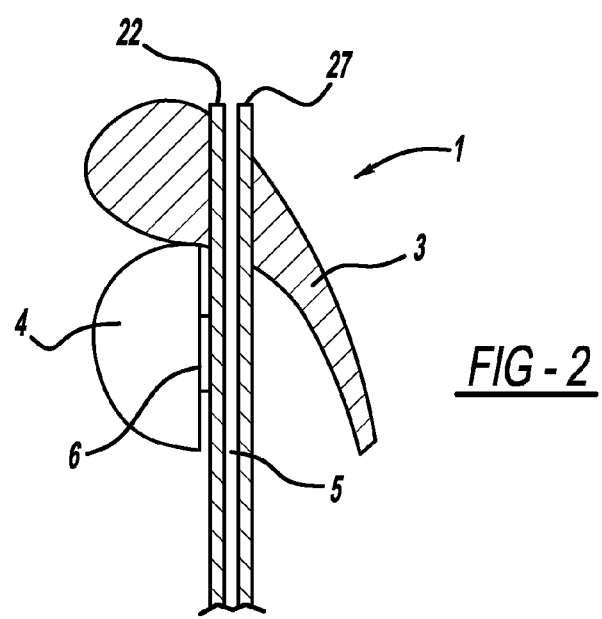
FIG. 2 is a cross-sectional view of FIG. 1.

FIG. 2 shows the embodiment of the seat belt from FIG. 1 in a cross-sectional view. In the example of the invention shown in FIG. 2 the seat belt 2 is made of two belt layers 21, 22, between which a hollow space 5 is formed, through which gas from a gas generator can be introduced into the seat belt 2. In the event of an accident, the seat belt 2 inflates and provides improved restraining action. In order to enable gas passage through the seat belt tongue 3 without difficulty, a relatively wide belt slot is configured within the seat belt tongue 3. Accordingly, the restraining element 4 is slightly thicker than the width of the belt slot.

It is apparent from FIG. 2 that the restraining element 4 is disposed only on the outside of a seat belt layer 22. The seat belt webbing is not penetrated, rather an adhesive region 6 is provided between the restraining element 4 and the seat belt layer 22. Alternatively, the restraining element 4 can also be welded to the seat belt 2 or welded to the seat belt layer 22. Likewise, in the case of a two-layer configuration of the seat belt 2, it is possible to penetrate one layer 21, 22 and fix the restraining element 4 to the one layer 22 in a conventional manner. A corresponding counter-piece for the restraining element 4 is then accommodated on the inside in the hollow space 5.

Figure 3:
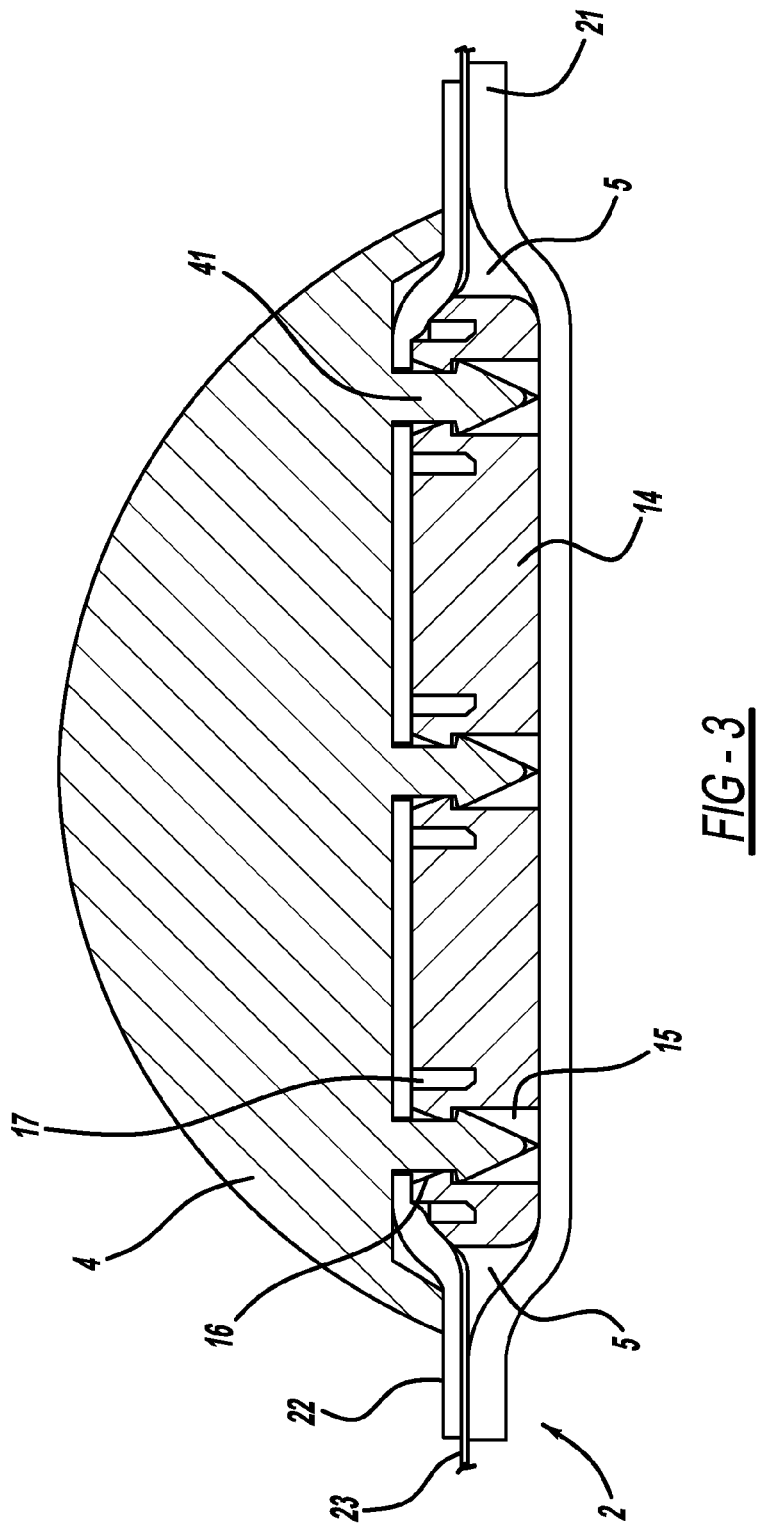
FIG. 3 is a cross-sectional view of a further embodiment.

FIG. 3 shows a cross-sectional view of an alternative embodiment, wherein the restraining element 4 is positively fastened through a mechanical fastening connection to a layer 22 of the seat belt 2. Positively locking elements 41, which are fastened to or configured on the restraining element 4, penetrate the top layer 22 of the seat belt 2 and engage a counter-piece 14 there. The counter-piece 14 is introduced in the hollow space 5 formed by the two seat belt layers 21, 22 and/or is fastened to the top layer 22, while the bottom layer 21 is fixed to the top layer 22, for example is glued or welded thereto. The counter-piece 14 comprises tapered inserts 16, by means of which the arrow-shaped positively locking elements 41 can be introduced into corresponding recesses 15 where they engage and lock together. Laterally, adjacent to the recesses 15 and/or the tapered inserts 16, relief recesses 17 are provided, which enable springback of the sides of the recess 15 that are provided with an undercut which facilitates snap-fit attachment of locking elements 41 into recesses 15.

Between the two layers 21, 22 of the seat belt, a seal 23 or an intermediate layer may be disposed.

Alternatively to the illustrated, solely two-ply configuration of the seat belt 2, it is possible to provide an expanding inflatable body made of an elastic, preferably gastight material, within the free space 5 formed between the top layer 22 and the bottom layer 21, wherein the gas of the gas generator is introduced into the expanding body. The two layers 21, 22 then serve as a casing for the expanding body, which preferably has a tube-shaped and single-piece configuration, in order to avoid or minimize leaks. In this way, gas is prevented from escaping from the hollow space 5 through the holes of the positively locking elements 41 within the seat belt layer 22. Likewise, fabric that feels comfortable and has sufficiently high tensile strength can be used for the seat belt layers 21, 22, without having to ensure increased gas tightness at the same time as protection against accidental leakage of the gas through the seat belt in the direction of the belt user.

Figure 4:
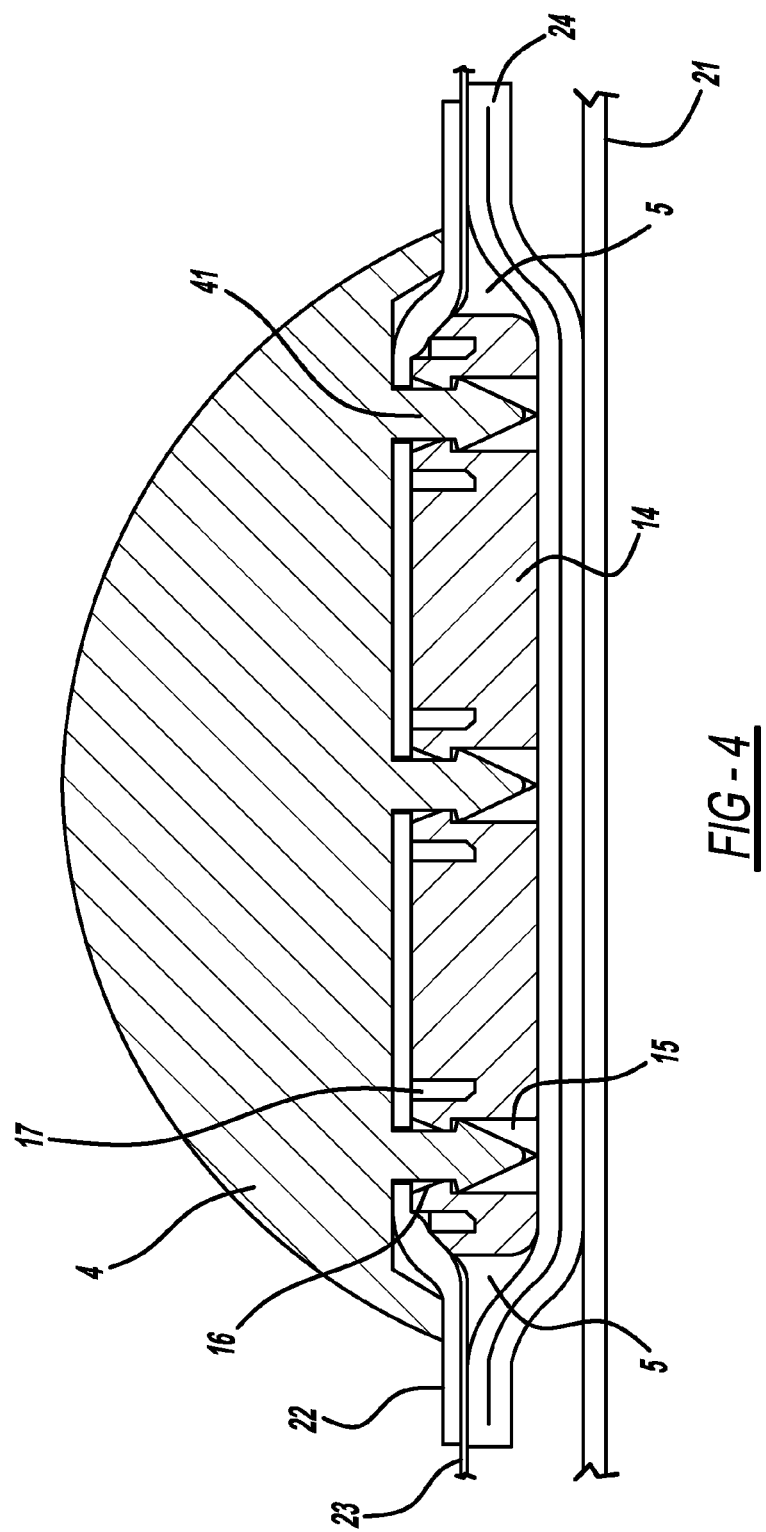
FIG. 4 is a variant of FIG. 3.

Such a variant of the seat belt is shown in FIG. 4, wherein the two seat belt layers 21, 22 are shown unconnected to one another. The expanding body 24 is disposed within the free space 5 between the seat belt layers 21, 22 and is in a flat, compressed state beneath the counter-piece 14 and between the counter-piece 14 and the bottom seat belt layer 21. On the seat belt layer 21, 22 outer ends, which are not shown, a weld connection, glued connection, or sewn connection can be provided, and optionally the seat belt can also be configured as one piece and receive both the counter-element 14 and the expanding body 24, which is connected to the gas generator by a fluidic connection.

In the applied position (i.e. when the seat belt 2 is worn by the user), the restraining element 4 is located on the top surface of the seat belt 2, that is on the side of the lap belt facing away from the belt user, and does not impair the usage and sliding behavior. The provided adhesive technique simplifies the assembly process and furthermore does not weaken the fabric of the seat belt 2. As a result of the one-sided application and/or one-sided attachment of restraining element 4, it is possible not to impair the function of the seat belt 2, particularly also when configured as an inflatable seat belt. In the case of a double-layered configuration, the restraining element 4 can also be press-fitted with a fabric layer.

While the above description constitutes the preferred embodiment of the present invention, it will be appreciated that the invention is susceptible to modification, variation and change without departing from the proper scope and fair meaning of the accompanying claims.

What is claimed is:

1. A seat belt for a motor vehicle, comprising a restraining element for controlling a position of a seat belt tongue, the restraining element protruding from and fastened to the seat belt only on one surface side thereof and the seat belt is configured as a multi-layer seat belt forming a hollow space between first and second seat belt layers, the hollow space being configured to be inflatable.

2. The seat belt according to claim 1, wherein the restraining element is at least 4 mm thick.

3. A seat belt according to claim 1 wherein the restraining element extends at least across half the width of the seat belt.

4. A seat belt according to claim 1 wherein the restraining element is provided with a label having informational content.

5. A seat belt according to claim 1 wherein the restraining element is fastened one of the first or second layers of the seat belt by means of a mechanical fastener or material bonding.

6. A seat belt according to claim 1 wherein the restraining element is glued or welded on to the one side of the seat belt.

7. A seat belt according to claim 1 wherein the restraining element is positively fastened to one of the layers of the seat belt, using a mechanical fastener press-fit thereto.

8. A seat belt according to claim 1 wherein the restraining element is disposed on the one side of the seat belt which faces a backrest cushion.

9. A seat belt according to claim 1 wherein the restraining element is disposed on the one side surface which further is a visible side of the seat belt in the storage position of the seat belt.

* * * * *